(12) United States Patent
Chappalli

(10) Patent No.: US 11,893,419 B2
(45) Date of Patent: Feb. 6, 2024

(54) HARDWARE ACCELERATORS USING SHARED INTERFACE REGISTERS

(71) Applicant: Apple Inc., Cupertino, CA (US)

(72) Inventor: Mahesh B. Chappalli, San Jose, CA (US)

(73) Assignee: Apple Inc., Cupertino, CA (US)

(*) Notice: Subject to any disclaimer, the term of this patent is extended or adjusted under 35 U.S.C. 154(b) by 246 days.

(21) Appl. No.: 17/149,422

(22) Filed: Jan. 14, 2021

(65) Prior Publication Data

US 2022/0066828 A1   Mar. 3, 2022

Related U.S. Application Data

(60) Provisional application No. 63/072,089, filed on Aug. 28, 2020.

(51) Int. Cl.
    *G06F 9/46* (2006.01)
    *G06F 9/50* (2006.01)
    *G06F 9/48* (2006.01)

(52) U.S. Cl.
    CPC .......... *G06F 9/5016* (2013.01); *G06F 9/485* (2013.01); *G06F 9/4812* (2013.01); *G06F 9/4881* (2013.01)

(58) Field of Classification Search
    CPC ...... G06F 9/5016; G06F 9/4812; G06F 9/485; G06F 9/4881
    See application file for complete search history.

(56) References Cited

U.S. PATENT DOCUMENTS

| 2013/0007398 | A1* | 1/2013 | Auernhammer | G06F 13/16 711/E12.002 |
| 2014/0189332 | A1* | 7/2014 | Ben-Kiki | G06F 9/30076 712/244 |
| 2014/0359636 | A1* | 12/2014 | Xu | G06F 9/4856 718/108 |
| 2016/0132329 | A1* | 5/2016 | Gupte | G06F 9/3851 718/103 |
| 2019/0108152 | A1* | 4/2019 | Lee | G06F 9/5038 |
| 2020/0050478 | A1* | 2/2020 | Underwood | G06F 9/4812 |
| 2021/0026684 | A1* | 1/2021 | Giri | G06F 9/463 |

* cited by examiner

*Primary Examiner* — Tammy E Lee
(74) *Attorney, Agent, or Firm* — Fletcher Yoder, P.C.

(57) ABSTRACT

Methods and systems include processors and hardware accelerators. The processor initiates a first process in a first hardware accelerator configured to aid the processor in performing the first process. The processor initiates the first process using one or more interface registers. The processor performs additional processing while the first hardware accelerator performs the first process after initiation of the first process. The processor also initiates a second process in a second hardware accelerator configured to aid the processor in performing a second process. Moreover, the processor initiates the second process using the one or more interface registers.

19 Claims, 7 Drawing Sheets

HARDWARE ACCELERATORS USING SHARED INTERFACE REGISTERS

CROSS-REFERENCE TO RELATED APPLICATIONS

This application claims priority to U.S. Provisional Patent Application No. 63/072,089, entitled "Hardware Accelerators Using Shared Interface Registers," filed Aug. 28, 2020, which this application incorporates in its entirety for all purposes.

BACKGROUND

The present disclosure relates generally to hardware accelerators in an electronic device using shared interface registers between the hardware accelerators.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Hardware accelerators are used to boost performance of processors and/or coprocessors. The hardware accelerators are particularly useful with compute-intensive portions of algorithms that run in firmware. The hardware accelerators may generally be controlled by the processor or co-processor to which they are attached. However, some hardware accelerators may block the processor or co-processor from performing additional operations until the processes performed by the hardware accelerators.

BRIEF DESCRIPTION OF THE DRAWINGS

Various aspects of this disclosure may be better understood upon reading the following detailed description and upon reference to the drawings in which.

DETAILED DESCRIPTION

Figure 1:
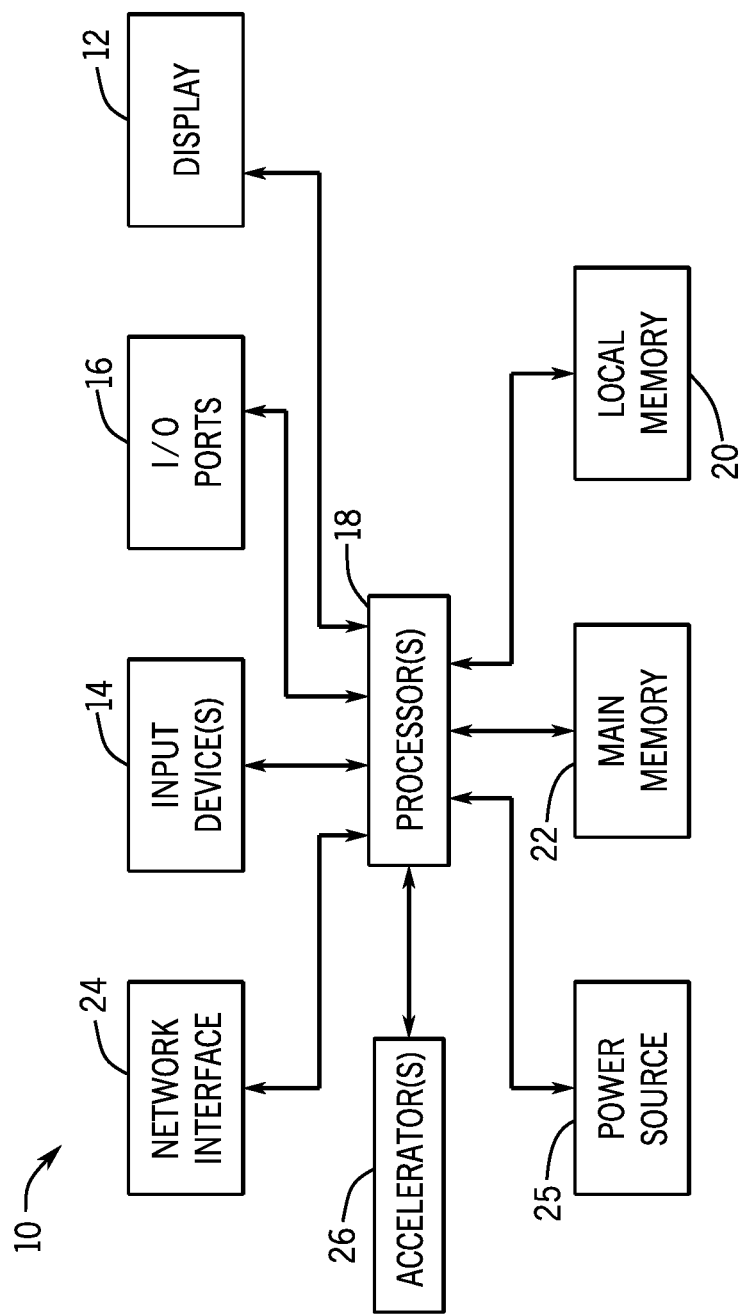
FIG. 1 is a block diagram of an electronic device with a display, where the electronic device includes hardware accelerators, in accordance with an embodiment of the present disclosure.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "including" and "having" are intended to be inclusive and mean that there may be additional elements other than the listed elements. Additionally, it should be understood that references to "one embodiment," "an embodiment," "embodiments," and "some embodiments" of the present disclosure are not intended to be interpreted as excluding the existence of additional embodiments that also incorporate the recited features.

A variety of hardware accelerators may be used to boost the performance of compute intensive portions of algorithms that run in firmware. These accelerators may be directly controlled by the processor/coprocessor to which they are attached. In one example, a coprocessor may be responsible for triggering the accelerators at a time sufficient to meet frame-timing-driven budgets. The triggering of the accelerators at the time may also be used in synchronization of the computations with a pixel datapath for processing image data for display on an electronic display or from a camera. The accelerators may be blocking accelerators or non-blocking accelerators.

As used herein, a blocking accelerator may cause the processor/coprocessor to stall until the accelerator completes its processing and provides the computed output back to the processor/coprocessor. For example, the blocking accelerator may be used to perform math functions and other functions, such as exponentiation, division, and trigonometric functions.

A non-blocking accelerator performs a process that is initiated by the processor/coprocessor. As part of the initiation, the processor/coprocessor configures the process and/or populates input data to the accelerator. After the initiation, the non-blocking accelerator continues the process to completion while the processor/coprocessor is free to continue working on other tasks. When the non-blocking accelerator has completed the process, the non-blocking accelerator raises an interrupt to the processor/coprocessor to indication completion of its computations.

As will be described in more detail below, an electronic device 10 that uses such hardware accelerators, such as the electronic device 10 shown in FIG. 1, may be any suitable electronic device, such as a computer, a mobile phone, a portable media device, a wearable device, a tablet, a television, a virtual-reality headset, and the like. Thus, it should be noted that FIG. 1 is merely an example of a particular implementation and is intended to illustrate the types of components that may be present in the electronic device 10.

In the depicted embodiment, the electronic device 10 includes an electronic display 12, one or more input devices 14, one or more input/output (I/O) ports 16, a processor(s) 18 having one or more processor(s) or processor cores, local memory 20, a main memory storage device 22, a network interface 24, a power source 25, and one or more accelerator(s) 26. The various components described in FIG. 1 may include hardware elements (e.g., circuitry), software elements (e.g., a tangible, non-transitory computer-readable medium storing instructions), or a combination of both hardware and software elements. It should be noted that the various depicted components may be combined into fewer components or separated into additional components. For example, the local memory 20 and the main memory storage device 22 may be included in a single component.

The processor(s) 18 may execute instruction stored in local memory 20 and/or the main memory storage device 22 to perform operations, such as generating and/or transmitting image data. As such, the processor(s) 18 may include one or more processors, such as one or more microprocessors, one or more application specific processors (ASICs), one or more field programmable logic arrays (FPGAs), one or more graphics processing units (GPUs), or the like. Indeed, the accelerator(s) 26 are shown as separate from the processor(s) 18, but may be integral to the processor(s) 18. Furthermore, as previously noted, the processor(s) 18 may include one or more separate processing logical cores that each process data according to executable instructions.

The local memory 20 and/or the main memory storage device 22 may store the executable instructions as well as data to be processed by the cores of the processor(s) 18. Thus, the local memory 20 and/or the main memory storage device 22 may include one or more tangible, non-transitory, computer-readable media. For example, the local memory 20 and/or the main memory storage device 22 may include random access memory (RAM), read only memory (ROM), rewritable non-volatile memory such as flash memory, hard drives, optical discs, and the like.

The network interface 24 may facilitate communicating data with other electronic devices via network connections. For example, the network interface 24 (e.g., a radio frequency system) may enable the electronic device 10 to communicatively couple to a personal area network (PAN), such as a Bluetooth network, a local area network (LAN), such as an 802.11x Wi-Fi network, and/or a wide area network (WAN), such as a 4G, LTE, or 5G cellular network. The network interface 24 includes one or more antennas configured to communicate over network(s) connected to the electronic device 10. The power source 25 may include any suitable source of energy, such as a rechargeable lithium polymer (Li-poly) battery and/or an alternating current (AC) power converter.

The I/O ports 16 may enable the electronic device 10 to receive input data and/or output data using port connections. For example, a portable storage device may be connected to an I/O port 16 (e.g., Universal Serial Bus (USB)), thereby enabling the processor(s) 18 to communicate data with the portable storage device. The I/O ports 16 may include one or more speakers that output audio from the electronic device 10. The processor(s) 18 may include one or more coprocessors or other microprocessors configured to supplement the capabilities of a primary processor (e.g., central processing unit).

The input devices 14 may facilitate user interaction with the electronic device 10 by receiving user inputs. For example, the input devices 14 may include one or more buttons, keyboards, mice, trackpads, and/or the like. The input devices 14 may also include one or more microphones that may be used to capture audio. The input devices 14 may include touch-sensing components in the electronic display 12. In such embodiments, the touch sensing components may receive user inputs by detecting occurrence and/or position of an object touching the surface of the electronic display 12.

The electronic display 12 may include a display panel with one or more display pixels. The electronic display 12 may control light emission from the display pixels to present visual representations of information, such as a graphical user interface (GUI) of an operating system, an application interface, a still image, or video content, by display image frames based at least in part on corresponding image data. In some embodiments, the electronic display 12 may be a display using liquid crystal display (LCD), a self-emissive display, such as an organic light-emitting diode (OLED) display, or the like.

Figure 2:
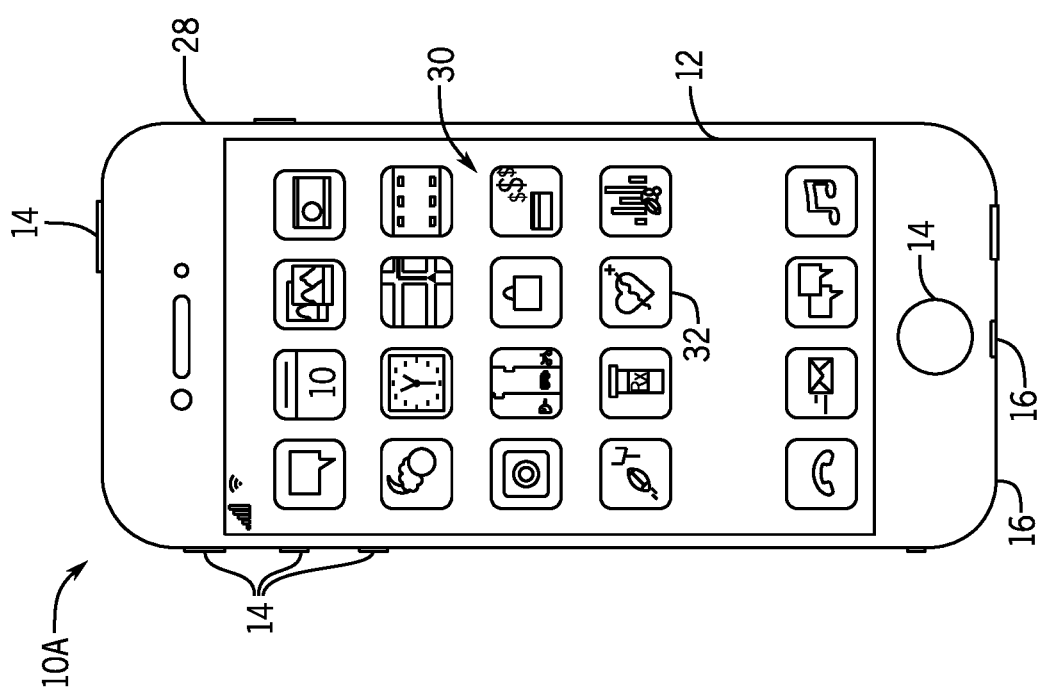
FIG. 2 is one example of the electronic device of FIG. 1, in accordance with an embodiment of the present disclosure.

As described above, the electronic device 10 may be any suitable electronic device. To help illustrate, one example of a suitable electronic device 10, specifically a handheld device 10A, is shown in FIG. 2. In some embodiments, the handheld device 10A may be a portable phone, a media player, a personal data organizer, a handheld game platform, and/or the like. For example, the handheld device 10A may be a smart phone, such as any IPHONE® model available from Apple Inc.

The handheld device 10A includes an enclosure 28 (e.g., housing). The enclosure 28 may protect interior components from physical damage and/or shield them from electromagnetic interference. In the depicted embodiment, the electronic display 12 is displaying a graphical user interface (GUI) 30 having an array of icons 32. By way of example, when an icon 32 is selected either by an input device 14 or a touch-sensing component of the electronic display 12, a corresponding application may launch.

Input devices 14 may extend through the enclosure 28. As previously described, the input devices 14 may enable a user to interact with the handheld device 10A. For example, the input devices 14 may enable the user to record audio, to activate or deactivate the handheld device 10A, to navigate a user interface to a home screen, to navigate a user interface to a user-configurable application screen, to activate a voice-recognition feature, to provide volume control, and/or to toggle between vibrate and ring modes. The I/O ports 16 may also extend through the enclosure 28. In some embodiments, the I/O ports 16 may include an audio jack to connect to external devices. As previously noted, the I/O ports 16 may include one or more speakers that output sounds from the handheld device 10A.

Figure 3:
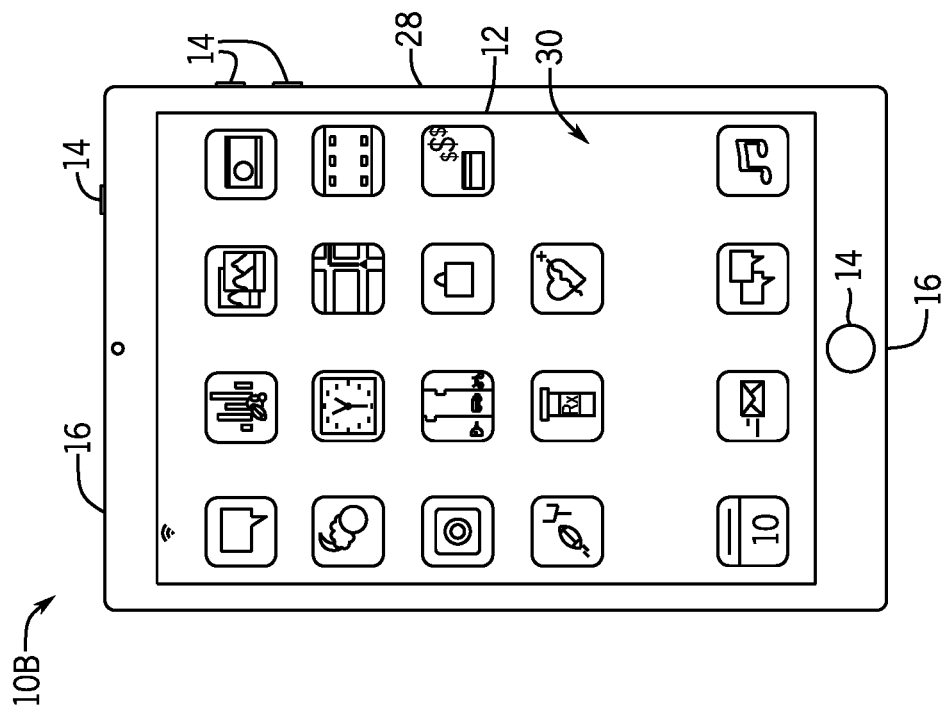
FIG. 3 is another example of the electronic device of FIG. 1, in accordance with an embodiment of the present disclosure.
Figure 4:
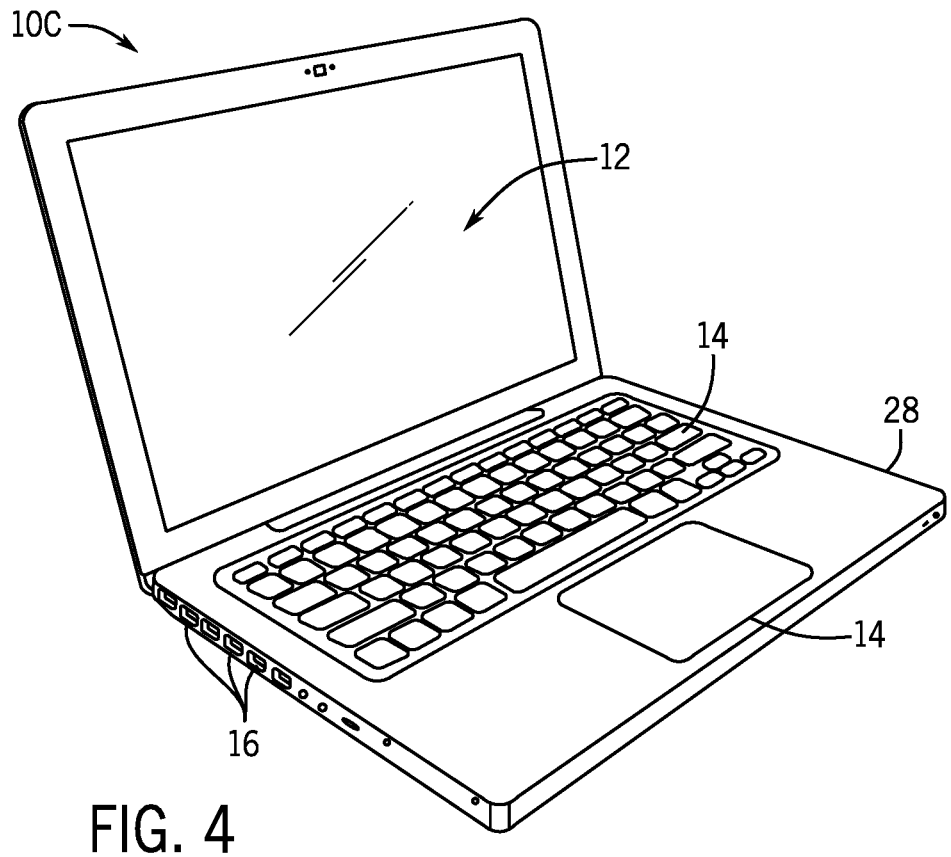
FIG. 4 is another example of the electronic device of FIG. 1, in accordance with an embodiment of the present disclosure.
Figure 5:
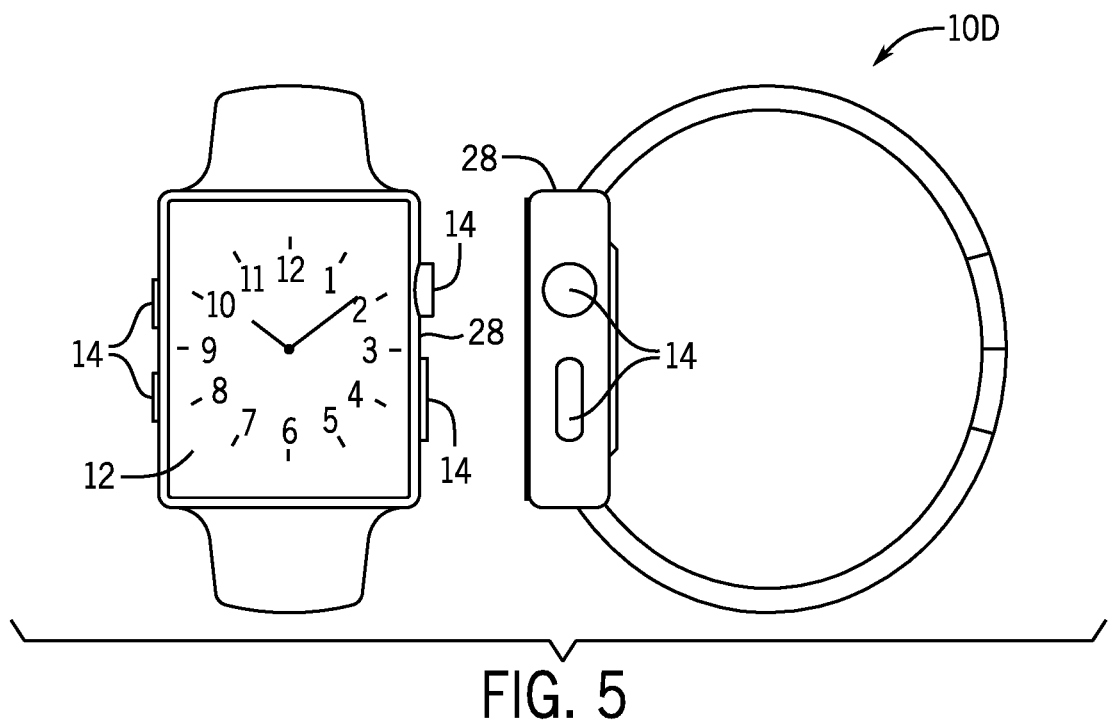
FIG. 5 is another example of the electronic device of FIG. 1, in accordance with an embodiment of the present disclosure.

Another example of a suitable electronic device 10 is a tablet device 10B shown in FIG. 3. For illustrative purposes, the tablet device 10B may be any IPAD® model available from Apple Inc. A further example of a suitable electronic device 10, specifically a computer 10C, is shown in FIG. 4. For illustrative purposes, the computer 10C may be any MACBOOK® or IMAC® model available from Apple Inc. Another example of a suitable electronic device 10, specifically a wearable device 10D, is shown in FIG. 5. For illustrative purposes, the wearable device 10D may be any APPLE WATCH® model available from Apple Inc. As depicted, the tablet device 10B, the computer 10C, and the wearable device 10D each also includes an electronic display 12, input devices 14, and an enclosure 28.

Figure 6:
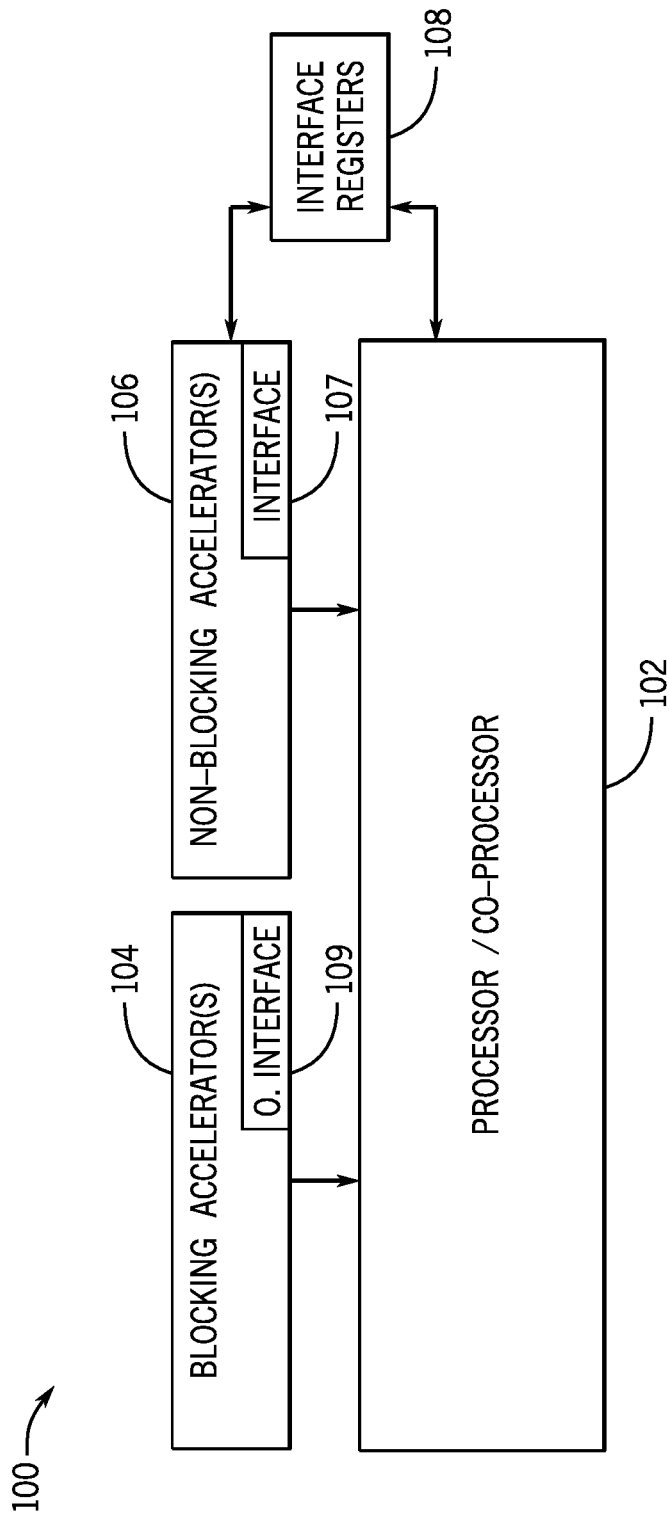
FIG. 6 is a simplified block diagram of a system having a processor/co-processor supported by one or more non-blocking accelerators and one or more blocking accelerators, in accordance with an embodiment of the present disclosure.

FIG. 6 is a simplified block diagram showing a system 100 where a processor/co-processor 102 is supported by one or more blocking accelerators 104 and/or one or more non-blocking accelerator 106. The processor/co-processor 102 may be included in the processor(s) 18 and/or provide assistance to processors in the processor(s) 18. For instance, the processor/co-processor 102 may include an coprocessor that is used to drive and/or compensate operation of pixels of the electronic display 12, a pixel contract control (PCC) that is used to improve contrast for readability/viewability in bright ambient environments and reduction of backlight on LCD panels, a control co-processor that configures one or more parameters (e.g., burn-in statistics, compressed frame replay, backlight updates, and pixel drive compensation) of a display pipeline, and/or other co-processors.

As previously discussed, a blocking accelerator 104 causes the processor/co-processor 102 to stall until the blocking accelerator 104 completes processing of data and provides an output to the processor/co-processor 102. For example, the blocking accelerator 104 may be used to perform mathematical functions such as exponentiation, division, trigonometric function, or the like.

The non-blocking accelerator 106 are kicked off by the processor/co-processor 102 subsequent to configuration of the process. The kickoff may include the processor/co-processor 102 populating input data to be used in the process. After the kickoff, the non-blocking accelerator 106 runs the process to completion as defined by the configuration, while the processor/co-processor 102 is free to work on other tasks as the non-blocking accelerator 106 runs the process. After the process has been completed, the non-blocking accelerator 106 raises an interrupt to the processor/co-processor 102 to indicate completion of the process. The firmware running on the processor/co-processor 102 may kick off the accelerator with subsets having a set order (e.g., the subsets may be in a raster scan monotonic order).

More than one of each type of accelerator may be used by a single processor/co-processor 102. For example, multiple non-blocking accelerators 106 may be chained together via their own local interfaces 107 performing each of their own types of processing (e.g., different mathematical operations). For example, the interface may include a Valid-Ready hardware interface. Furthermore, the non-blocking accelerator 106 may have access to locations in memory of the processor/co-processor 102 and/or interface registers 108 to enable the transfers of appropriate data. In contrast, in some embodiments, the blocking accelerators may access only their output registers 109 that merely holds information from the blocking accelerators 104 to be passed back to processor/co-processor 102.

Configuration of the non-blocking accelerators 106 is through registers that are accessible to both the co-processor and/or related portions of the electronic device 10 (e.g., a display pipeline fabric). A status from the non-blocking accelerator 106 is also communicated through registers to the co-processor and/or other related portions of the electronic device 10. Non-blocking accelerators 106 can be configured to be chained together through a local memory in the interface or may operate together through the processor/co-processor 102.

Some non-blocking accelerators 106 may support configuration parameters, triggers, status values, and interrupts as interface registers that are shared between the non-blocking accelerators. The accelerators may use additional parameters beyond those discussed below for specific functions. In some embodiments, at least some non-blocking accelerators may not support all of the options listed below (e.g., for boundary conditions).

Non-blocking accelerators 106 may internally maintain input data context to be used to complete computations. Such maintenance may delay availability of an output based on how the non-blocking accelerator 106 is configured and called. For example, a non-blocking accelerator 106 may be configured to perform a computation using a 3×3 window centered around a current element. If the accelerator is called by firmware with only one row of data at each call, no output can be generated for the first call. Further, on a last call corresponding to a last row of input data, two rows of outputs will be generated. The following examples provide a list of example interface registers 108 that may be used. However, these examples are meant to be an inclusive list rather than an exhaustive list of all interface register types.

AcceleratorID—Non-blocking accelerators 106 may utilize a register to store a unique identifier for the respective non-blocking accelerator 106.

Bypass—Non-blocking accelerators 106 may utilize an output bypass register that may provide functionality defined for individual non-blocking accelerators 106.

InputSelect—The InputSelect register selects whether an input is obtained through a memory interface or from another (e.g., valid-ready) interface from another non-blocking accelerator.

InputBaseAddress—The InputBaseAddress register provides a memory-mapped base when the input data is obtained through the memory interface or an AcceleratorID when the input data is obtained from the valid-ready interface. The value for each instantiation of a process may be independent from any context of previous instantiations of the process.

InputSize—The InputSize register indicates a number of units of data present in the input data. For instance, the number of units may be represented in a two-dimensional unit (e.g., width and height). In other words, the InputSize register reflects an entire amount of data to be processed irrespective of the subset of data that will be processed at a given time UnitSize—The UnitSize register indicates a number of elements that are included in each unit of data. For instance, the number may be represented as a two-dimensional unit (e.g., width and height).

ProcessSize—The ProcessSize register indicates a cumulative sum of a number of units of data processed including a current "chunk." The ProcessSize may be represented a two-dimensional unit (e.g., width and height). The ProcessSize may be constrained to be no greater than the InputSize. For instance, respective dimensions (e.g., height and width) of the ProcessSize may be limited to a corresponding dimension size for the InputSize. When the ProcessSize is smaller than the InputSize, the non-blocking accelerator 106 transitions to a WAIT state on completion of the task.

BoundaryCondition—The BoundaryCondition register defines handling of boundary cases. For instance, the BoundaryCondition may include a ZeroPad condition that assumes that elements outside of the boundary are zero. The BoundaryCondition may include a Replicate condition that assumes that elements outside of the boundary are repeated from the nearest edge. The BoundaryCondition may include a MirrorAtHalf condition that assumes that elements outside of the boundary are mirrored from the nearest edge with mirroring starting from the nearest edge element. The BoundaryCondition may include a MirrorAtFull condition that assumes that elements outside of the boundary are mirrored from the nearest edge with mirroring starting from one element after the nearest edge element. Additionally or alternatively, the BoundaryCondition register may indicate other boundary techniquest to be used in determining how to handle boundary data.

OutputSelect—The OutputSelect register selects whether output is written through the memory interface and/or passed over another interface (e.g., valid-ready interface) to another non-blocking accelerator 106.

OutputBaseAddress—The OutputBaseAddress register indicates a memory-mapped base address when output data is written through the memory interface. The value for each instantiation of a process may be independent from any context of previous instantiations of the process.

OutputStride—The OutputStride register indicates a memory address spacing (e.g., in bytes) between vertically collocated elements at the output of the non-blocking accelerator 106. The value may be ignored for output over the valid-ready interface Reset—The Reset register is used to cause a firmware-triggered reset of any state within the non-blocking accelerator 106. During a reset, the non-blocking accelerator 106 terminates any processing and transitions to an IDLE state after completion of any post-reset initialization Run—The Run register is used for firmware-based control for the non-blocking accelerator 106 that is set to a value (e.g., 1) when an appropriate state (e.g., IDLE or WAIT) that triggers a start/continuation of the processing of the non-blocking accelerator 106. This value may be cleared when the non-blocking accelerator 106 starts its computation process.

State—The State register reflects a state of a data path of the non-blocking accelerator 106.

InputPos—The InputPos register indicates a position (e.g., X, Y) of a first input data to be used by the non-blocking accelerator 106.

OutputPos—The OutputPos register indicates a position (e.g., X, Y) of a next output data that will be generated by the non-blocking accelerator 106. For example, on completion of processing the InputSize, the value is one larger than the InputSize in height with a width of 0.

TaskCompleted—The TaskCompleted register includes an interrupt that is generated when the non-blocking accelerator 106 transitions from a BUSY state to an IDLE or WAIT state after completion of processing and writing of data. The interrupt may be generated even when the accelerator is unable to produce an output with the ProcessSize used in a call and the context requirements of the non-blocking accelerator 106.

TaskCanceled—The TaskCanceled register includes an interrupt generated when the non-blocking accelerator 106 transitions to an IDLE state from either a BUSY or WAIT subsequent to processing being terminating before completion of a Reset command.

InvalidMemAddress—The InvalidMemAddress register includes an interrupt generated if the InputBaseAddress or the OutputBaseAddress is outside of a valid address range when the InputSelect or the OutputSelect specifies a memory interface. After assertion of the interrupt, the non-blocking accelerator 106 executes reset behavior. For example, the non-blocking accelerator 106 may terminate any processing and transition to an IDLE state after completion of any post-reset initialization.

Using any or all of the foregoing registers, non-blocking accelerators 106 may be used to provide a variety of different functions that may be used to supplement a variety of different processor/co-processor functions.

Figure 7:
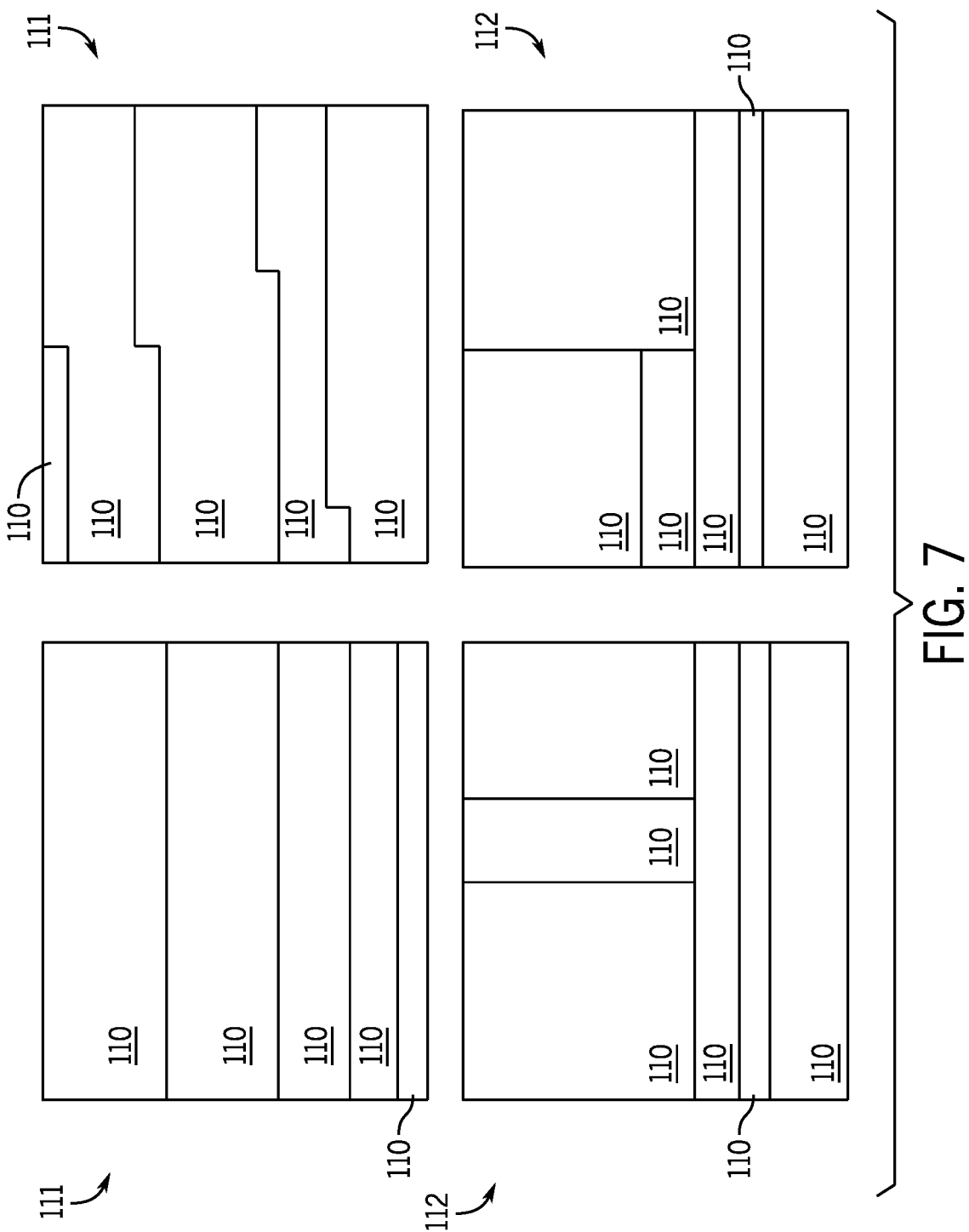
FIG. 7 is a diagram of chunking patterns that may be used by the one or more non-blocking accelerators of FIG. 6, in accordance with an embodiment of the present disclosure.

In some embodiments, when a non-blocking accelerator 106 is used to operate on data in chunks through the ProcessSize being smaller than an InputSize, the firmware may ensure that the InputSize is traversed in a particular order (e.g., raster scan order). For example, FIG. 7 illustrates chunks 110 of data in memory to be used in the processes performed by the non-blocking accelerators 106. For instance, valid chunking patterns 111 permit a raster scan to scan all portions of a particular chunk 110 in order. Invalid chunking patterns 112 for the non-blocking accelerator 106 that may not satisfy the particular order. Specifically, using a raster scan, a first chunk 110 may be partially scanned before a second chunk 110 is partially scanned before returning to the first chunk 110.

When the non-blocking accelerator 106 operates with co-processor, each element may be accessed in a container of a certain size (e.g., 32-bits) with an alignment (e.g., least significant bit or most significant bit) to the bit-width supported by the specific non-blocking accelerator 106.

Figure 8:
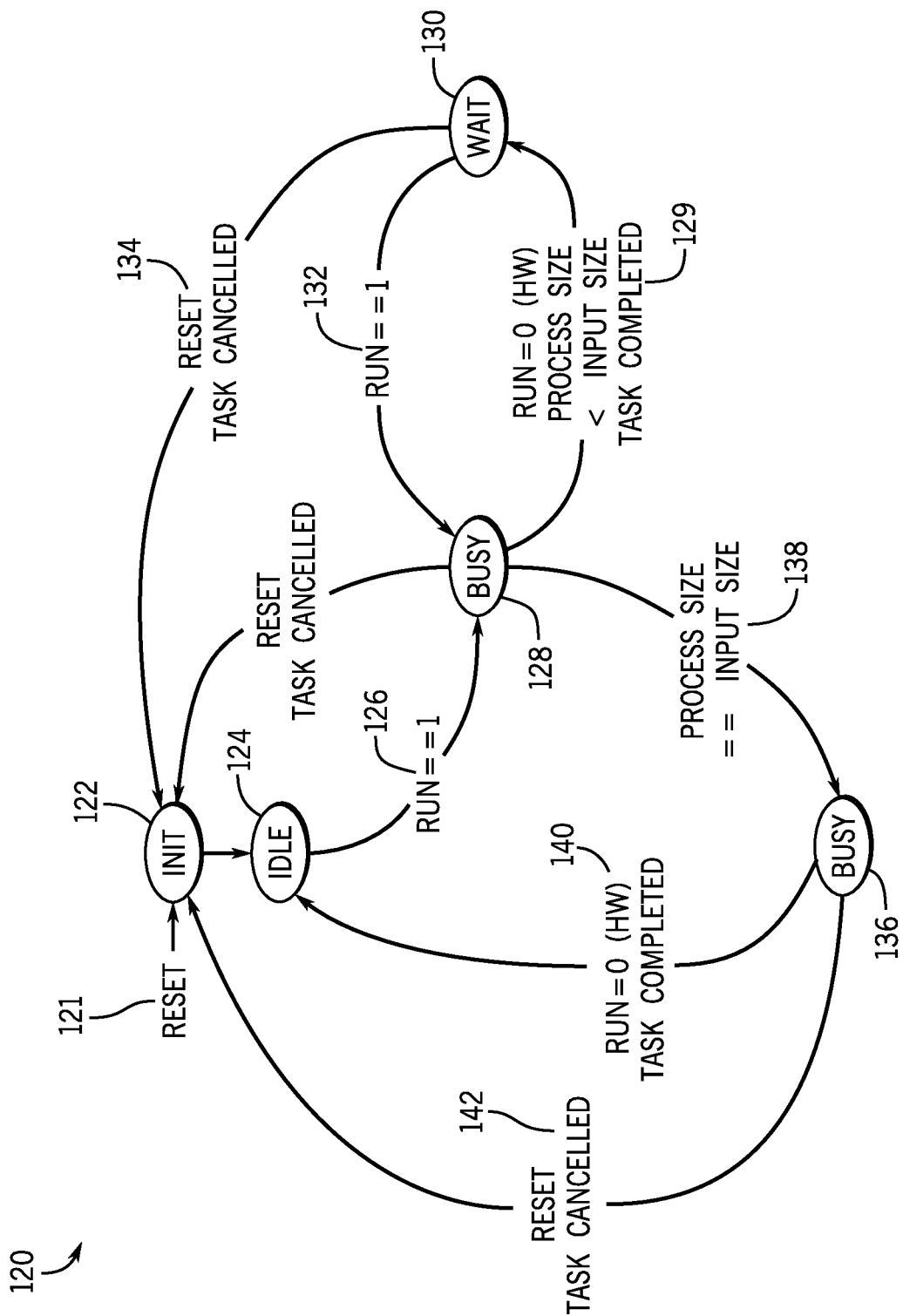
FIG. 8 is a state diagram that may be used by the one or more non-blocking accelerators of FIG. 6, in accordance with an embodiment of the present disclosure.

FIG. 8 is a state diagram 120 that may describe the behavior of the non-blocking accelerators 106. A reset (e.g., a firmware-triggered reset through the Reset register 121 (e.g., a Reset bit/flag)) causes the accelerator to enter an INIT state 122 and complete any post-reset initialization prior to transitioning to an IDLE state 124. The non-blocking accelerator 106 waits in the IDLE state 124 till it is configured by firmware and kicked off by firmware setting the Run register (e.g., a Run bit/flag) 126 to a specific value (e.g., 1). While the non-blocking accelerator 106 is processing data, it remains in a BUSY state 128.

If the ProcessSize is less than the InputSize and the task is completed 129, the Run register is reset and the TaskCompleted register is set. In other words, if the amount of data to be processed in a specific run is smaller than the amount of data passed to the non-blocking accelerator 106 for processing, the non-blocking accelerator 106 transitions to a WAIT state 130 after completion of processing the data to wait for additional runs or a reset.

If the ProcessSize amount of data is insufficient to generate an output given the context for the process for the non-blocking accelerator 106, the non-blocking accelerator consumes the input data by filling its internal buffer and transitions to the WAIT state 130 after clearing of Run to 0 and setting of the TaskCompleted interrupt. From the WAIT state 130, further processing of subsets of data may be kicked off by firmware by setting the Run register to a specific value (e.g., 1). Additionally or alternatively, the non-blocking accelerator 106 may return to the INIT state 122 and set the TaskCanceled register when a Reset register/flag/bit is set 134.

In the BUSY state 128, on completion of processing of the input data, the non-blocking accelerator 106 transitions to complete any post-processing (e.g., write(s) of output data) in a BUSY (post-process) state 136 if data-to-be currently processed is the same size as the input data (e.g., ProcessSize=InputSize 138). In other words, when the total of all subsets of data processed using ProcessSize matches InputSize, any post-processing will be automatically triggered. On successful completion of this step, the non-blocking accelerator 106 clears the Run register/flag/bit, sets the TaskCompleted interrupt 140, and transitions to the IDLE state 124. However, if the firmware asserts a Reset 142, the non-blocking accelerator 106 sets the TaskCanceled register and returns to the INIT state 122. Thus, if firmware asserts Reset at any time during the BUSY states 128, 136 or the WAIT state 130, the non-blocking accelerator 106 raises the TaskCanceled interrupt and immediately transitions to the IDLE state 124.

While the foregoing relates to non-blocking accelerators 106, blocking accelerators 104 may interface with firmware vie registers. The blocking accelerators 104 work from inputs specified as configuration registers with a number, precision, and packing of the inputs being specific to each blocking accelerator 104. The outputs of the blocking accelerators 104 are also written to registers. When the firmware of the processor/co-processor 102 reads an output register, the computation based on the input values is completed and the read of the output register is delayed until completion of the computations and population of the output register.

Figure 9:
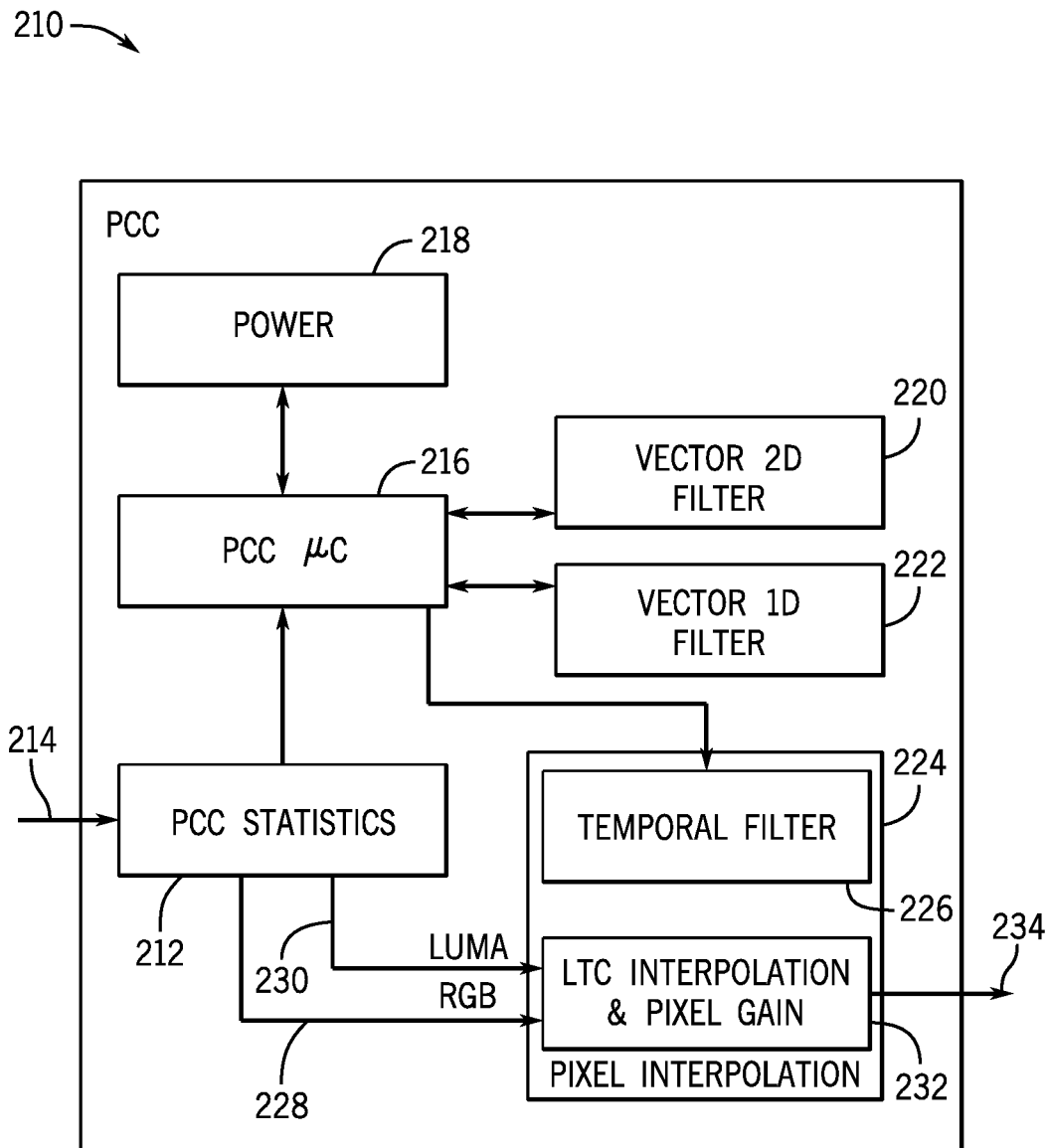
FIG. 9 is a block diagram of an example of non-blocking hardware accelerators with a blocking hardware accelerator all aiding a co-processor in performing processing, in accordance with an embodiment of the present disclosure.

FIG. 9 is an illustration of pixel contrast control (PCC) circuitry 210 as an example of circuitry that may utilize one or more blocking accelerators 104 and/or one or more non-blocking accelerators 106 in performing operations. Specifically, the PCC circuitry 210 that improves readability/viewability in bright ambient environments and reduction of backlight on LCD panels to save power while retaining perceptual fidelity through local tone mapping. The PCC circuitry 210 includes PCC statistics collector 212 that receives image data 214 and collects statistics (e.g., local and/or global statistics) and passes the statistics to a PCC co-processor 216. The statistics may include luminance, delay, variance of luminance, maximum values, average values, headroom, histograms, and/or other statistics related to the image data 214.

To boost the performance of firmware running on the PCC co-processor 216, hardware assistance is available in the form of accelerators. A blocking accelerator 218 and two non-blocking accelerators 220 and 222 are available to the PCC co-processor. The non-blocking accelerators 220 and 222 may be configured to either feed each other, read data from memory, and/or write the result to memory. To support firmware data flows, the non-blocking accelerators 220 and 222 may support continuation of processing after power-gating. For example, the non-blocking accelerators 220 and 222 may retain all state information that is used to continue processing/operation. In some embodiments, it is the responsibility of firmware running on the PCC co-processor 216 to ensure that all non-blocking accelerators 220 and 222 are in an appropriate state (e.g., WAIT or IDLE state) prior to power-gating. If the non-blocking accelerators 220 and 222 are in any other states when power-gating occurs, correct operation after power gating has ended is not guaranteed.

The non-blocking accelerator 222 may include a vector 1D filter that operates on input data consisting of an array of units with each unit being a vector of elements. The non-blocking accelerator 222 is used to filter input data. The non-blocking accelerator 222 may include the previously discussed interface registers as well as additional registers to identify a number of bits used to represent each element and to identify filter taps to be used in the filtration.

The non-blocking accelerator 220 may include a vector 2D filter that operates on the input data with a two-dimensional FIR filter. The non-blocking accelerator 220 may include the previously discussed interface registers as well as additional registers to identify a number of bits used to represent each element, identify a size of the filter, and identify filter taps to be used in the filtration.

The blocking accelerator 218 may include a power function hardware accelerator that assists the PCC co-processor 216 in perform power function calculations for the PCC circuitry 210.

Using the calculations in the PCC co-processor 216 and the PCC statistics, a pixel interpolator 224 is used to adjust the image data 214. The pixel interpolator 224 includes a temporal filter 226 that is used to filter outputs from the PCC co-processor 216. The pixel interpolator 224 also receives RGB values 228 and luma values 230 from the PCC statistics collector 212. The pixel interpolator 224 uses the filtered values from the PCC co-processor 216, the luma values 230, and the RGB values 228 to perform a local tone curve (LTC) and pixel gain compensation using LTC interpolation and pixel gain compensator 232 to output interpolated image values 234.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible, or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A method, comprising:
using a processor, initiating a first process in a first hardware accelerator configured to aid the processor by performing the first process, wherein initiating the first process comprises using one or more interface registers, and wherein the one or more interface registers comprises an accelerator identifier register that is used to uniquely identify the first hardware accelerator, a second hardware accelerator, and a third hardware accelerator;
using the processor, performing additional processing while the first hardware accelerator performs the first process after the processor initiates the first process and before the first process is completed;
using the processor, initiating a second process in the second hardware accelerator configured to aid the processor by performing the second process, wherein initiating the second process comprises using the one or more interface registers;
using the processor, initiating a third process in the third hardware accelerator configured to aid the processor in performing the third process, wherein the third hardware accelerator comprises a blocking accelerator that aids in the third process without using the one or more interface registers other than the accelerator identifier register; and
receiving, at the processor, an indication via the one or more interface registers to indicate that the first hardware accelerator has completed the first process and that the processor is to operate on results from the first process.

2. The method of claim 1, wherein the processor comprises a co-processor configured to assist a central processing unit in performing the first and second processes via the respective first and second hardware accelerators.

3. The method of claim 1, wherein the blocking accelerator causes the processor to halt performing calculations for other processes after the third process is initiated until the third process is completed.

4. The method of claim 3, wherein the third hardware accelerator has no access to the one or more interface registers.

5. The method of claim 3, wherein the third hardware accelerator has access to its own interface registers without access to the one or more interface registers accessible by the first and second hardware accelerators.

6. The method of claim 1, comprising, using the processor, performing additional processing while the second hardware accelerator performs the second process after the processor initiates the second process and before the second process is completed.

7. The method of claim 1, wherein the third hardware accelerator does not have access to the one or more interface registers other than the accelerator identifier register.

8. The method of claim 1, wherein initiating the first process using the one or more interface registers comprises using an input memory address register of the one or more interface registers, wherein the input memory address register is configured to indicate a memory location where data is to be retrieved for the first process.

9. The method of claim 1, wherein the indication comprises an interrupt.

10. An electronic device comprising:
a first hardware accelerator configured to assist in performing processes of a first type;
a second hardware accelerator configured to assist in performing processes of a second type;
a third hardware accelerator configured to assist in performing processes of a third type;
a plurality of interface registers accessible by both the first and second hardware accelerators, wherein the first and second hardware accelerators are non-blocking accelerators that use the plurality of interface registers, and the third hardware accelerator is a blocking accelerator that does not use the plurality of interface registers other than an accelerator identifier register to assist in performing processes of the third type;
a processor configured to execute instructions configured to cause the processor to:
initiate a first process of the first type in the first hardware accelerator using the plurality of interface registers;
perform additional processing while the first hardware accelerator performs the first process after the first process is initiated;
initiate a second process of the second type in the second hardware accelerator using the plurality of interface registers; and
receive an indication via the plurality of interface registers to indicate that the first hardware accelerator has completed the first process and that the processor is to operate on results from the first process.

11. The electronic device of claim 10, wherein the plurality of interface registers comprises a bypass register configured to enable a bypass of a respective one of the first hardware accelerator or the second hardware accelerator of the electronic device.

12. The electronic device of claim 10, wherein the first hardware accelerator comprises a non-blocking accelerator that has access to an input memory location indicated in the plurality of interface registers, wherein data at the input memory location is to be fetched by the non-blocking accelerator as input data to be processed in the first process.

13. The electronic device of claim 10, wherein the first hardware accelerator comprises a non-blocking accelerator that has access to an output memory location indicated in the plurality of interface registers, wherein data at the output memory location stored by the non-blocking accelerator as an output of the second process.

14. The electronic device of claim 10, wherein the plurality of interface registers comprises an invalid memory address register that functions as an memory address interrupt to the processor to indicate that an input memory location or an output memory location is invalid, wherein the input memory location is configured to indicate an input location of input data to be input to the first process, and the output memory location is configured to indicate an output location of output data to store outputs from the first process.

15. The electronic device of claim 10, wherein the indication comprises an interrupt.

16. The electronic device of claim 10, wherein the third hardware accelerator does not have access to the plurality of interface registers other than the accelerator identifier register.

17. A method comprising:
receiving an indication that a process is to be performed at a non-blocking accelerator from a processor at an interface register of a plurality of interface registers for a plurality of non-blocking accelerators;
in response to the indication, causing the non-blocking accelerator to enter an idle state;
in the idle state, receiving a run indication from the processor, wherein the run indication indicates that the process at the non-blocking accelerator is to be started, wherein the indication comprises a value in a run register of the plurality of interface registers;
based at least in part on the run indication, entering a busy state and beginning the process in the non-blocking accelerator while the processor is configured to perform other processing while the process is completed;
in the busy state, causing the non-blocking accelerator to change from the busy state to the idle state and to raise a completion indication of the plurality of interface registers to indicate that the process has been completed; and
causing a second process to be started in a blocking hardware accelerator, wherein the blocking accelerator aids in the second process without using the plurality of interface registers other than an accelerator identifier register.

18. The method of claim 17, wherein the indication comprises configuring a respective non-blocking accelerator of the plurality of non-blocking accelerators using the plurality of interface registers for a respective process to be performed by the respective non-blocking accelerator.

19. The method of claim 17, wherein causing the non-blocking accelerator to change the run register comprises:
determining whether a process size indicated in the plurality of interface registers is smaller than or equal to an input size indicated in the plurality of interface registers, wherein the process size corresponds to a cumulative amount of data processed by the process;
when the process size is smaller than the input size, entering a wait state that is configured to enable the non-blocking accelerator to perform additional processing on additional input information, wherein the input size corresponds to a total amount of data to be processed by the process; and when the process size is equal to the input size, returning to the idle state.

\* \* \* \* \*